United States Patent

[11] 3,618,614

[72] Inventor Vincent J. Flynn
 Englewood, N.J.
[21] Appl. No. 826,778
[22] Filed May 6, 1969
[45] Patented Nov. 9, 1971
[73] Assignee Scientific Tube Products, Inc.
 Englewood, N.J.
 Continuation-in-part of application Ser. No. 518,186, Jan. 3, 1966, now abandoned, Continuation-in-part of application Ser. No. 571,592, Aug. 10, 1966, now abandoned.

[54] NONTOXIC RADIOPAQUE MULTIWALL MEDICAL-SURGICAL TUBINGS
10 Claims, 3 Drawing Figs.

[52] U.S. Cl. ............................................... 128/348,
 128/2, 138/137, 252/478
[51] Int. Cl. ............................................... A61m 25/00
[50] Field of Search ........................... 128/348–351,
 239, 2, 2.05; 252/478; 138/118, 137, 141; 264/47, 173

[56] References Cited
UNITED STATES PATENTS

| | | | |
|---|---|---|---|
| 2,112,737 | 3/1938 | Dodge | 128/350 |
| 2,237,219 | 4/1941 | Flynn | 138/118 |
| 2,667,875 | 2/1954 | Wallace | 128/349 |
| 2,857,915 | 10/1958 | Sheridan | 128/349 |
| 2,888,954 | 6/1959 | Gates | 138/137 |
| 2,918,394 | 12/1959 | Smith | 138/137 X |
| 2,932,323 | 4/1960 | Aries | 138/137 |
| 3,314,430 | 4/1967 | Alley et al. | 128/350 |
| 3,336,918 | 8/1967 | Jeckel | 128/2.05 |
| 3,416,531 | 12/1968 | Edwards | 128/348 |
| 3,434,869 | 3/1969 | Davidson | 128/349 |

FOREIGN PATENTS

| | | | |
|---|---|---|---|
| 686,445 | 1/1953 | Great Britain | 252/478 |

Primary Examiner—Dalton L. Truluck
Attorney—Morgan, Finnegan, Durham and Pine

ABSTRACT: Multiwall surgical tubing, especially for stomach, thoracic or rectal use, has an inner, relatively thick transparent tube encased in a relatively thin, visually transparent, outer shell which contains a radiopaque material, so that as the X-radiation passes through the lateral edges of the composite tube it must pass through a relatively long path at the side edges of the tubing, while the central portion remains substantially transparent. Thus, the position of the tube is readily observed by fluoroscopy, while the flow of contrast media or clots may be observed in the central portion. As used for a heart, ureteral or vein intubation catheter, the multiwall tubing is formed of extruded polyethylene containing a nontoxic, radiopaque-plasticizing compound such as bismuth, oxychloride, which is encased in an extruded outer shell of transparent polyethylene having a hardness and exterior smoothness superior to that of the inner tubing, which outer shell also increases the angular resistance to twisting in use.

PATENTED NOV 9 1971

3,618,614

INVENTOR
VINCENT J. FLYNN

BY
Morgan, Finnegan, Durham & Pine
ATTORNEYS.

NONTOXIC RADIOPAQUE MULTIWALL MEDICAL-SURGICAL TUBINGS

The present application is a continuation-in-part of my prior application Ser. No. 518,186, filed Jan. 3, 1966 and of my prior application Ser. No. 571,592, filed Aug. 10, 1966; both now abandoned.

The present invention relates to improved nontoxic medical-surgical tubings for internal use, parts of which tubings are opaque to X-rays and are readily visualized by fluoroscopic devices or in X-ray photographs. The invention is particularly concerned with nontoxic radiopaque multiwall medical-surgical tubings which, because of their overall combination of properties, offer particular advantages when used as tubing for stomach, rectal and thoracic uses, or as heart catheters, ureteral catheters and vein intubation catheters.

While it is known to add radiopaque materials to plastic medical-surgical tubings to thereby render them opaque to X-rays the materials heretofore used have not been satisfactory. Heavy metals such as lead and lead compounds, while imparting radiopacity, are toxic and hence undesirable for any prolonged contact with tissues or bloodstream. Other radiopaque pigments cause the plastic materials to lose their original and desired thermoplastic properties with increasing amounts of the radiopaque material. For example, it has been found that extruded plastic tubings containing adequate loadings of nontoxic radiopaque materials, such as bismuth, compounds, become rough-surfaced and stiff. Such hard, granular radiopaque pigments detract from the desired flexibility, ductility and maneuverability of the tubing in direct proportion to the amount of radiopacity they impart. Because of stiffness and reduced ductility imparted by such pigments, it is difficult to shape the tubings into desired configurations.

Heretofore it has been a problem with radiopaque medical-surgical tubings containing adequate loadings of approved nontoxic radiopaque pigments, such as bismuth oxychloride, to be able to controllably and evenly draw down or mold the same to form a tapered tip or to shape in into special configurations, such as a "J" tip of "shepherd's crook." When tapered tips of the open-end type are made from such tubings, the thin wall section of the tip will lack flexibility and that portion will also suffer from greatly reduced tensile strength because of the heavy loading of the granular, nonplastic pigment material. At the same time, it has been found that the proximal end cannot be satisfactorily flared or enlarged to receive various equipment, such as special fittings or syringes through which fluids and other material can be fed into the tube. These forming requirements, which involve use of thermoplastic techniques, make it desirable for the material of the tubing to retain in high degree the thermoplastic properties of the resins used. These properties in the desired combinations are now found in presently available radiopaque tubings.

Another object of the invention is to reduce the cost of materials in radiopaque catheters and the like by providing multilayer extruded thermoplastic tubings wherein one layer may be of plastic transparent to X-rays and also visually transparent while the other layer, coextruded therewith, is radiopaque. This object of the invention includes the provision of a radiopaque layer which, under X-ray photography or fluoroscopy will delineate the external borders of the tubing while leaving free a substantial internal zone which is transparent visually and to X-rays and therefore will permit observation of contrast media, clots and other obstructions which may appear in the lumen of the tubing.

Such tubings may be made of polyvinyl resins, having high radiopacity but visual clarity and in which plasticity, flexibility, torque resistance and other desirable properties are incorporated.

It has been found that the objects of this invention applicable to large diameter tubings, such as stomach, thoracic and rectal tubings, are realized by medical-surgical tubing comprising an elongated extruded inner tube or core of plastic material that contains no radiopaque substance intermixed therewith, and which is also visually transparent, and a relatively thin external shell of extruded plastic material encasing said inner tube and containing a nontoxic plasticizing substance intermixed therewith, said substance imparting radiopacity to the shell but preferably leaving same transparent for visual observation. The shell of said composite or dual-layer tubing preferably has a hardness and exterior smoothness superior or at least equal to that of said extruded inner tube; said multiwall tubing being highly flexible for conforming to tortuous body passages through which the tube is passed, yet having substantial angular resistance to twisting about its longitudinal axis so that the distal end will rotate in substantial conformity to twisting of the proximal end when the tubing is being passed through and is positioned in such body passages.

In one preferred embodiment of the invention the inner tube is relatively thick and the plastic material thereof (preferably polyethylene) contains one or more materials having radiopaque properties, at least one of such materials also having plasticizing properties or, alternatively, contains a polymeric material which imparts greater flexibility and softness to the inner tube material in which a radiopaque material is impregnated, so that the plastic material in the blend retains its desired properties of plasticity, softness and flexibility substantially unimpaired. About and encasing said inner tube is a relatively thin shell of plastic material coextruded therewith and bonded thereto. The outer shell is preferably an extruded plastic material such as polyethylene, which is free of pigment and radiopaque material, whereby a clear, transparent outer casing having a slick, glasslike surface is provided surrounding the radiopaque plastic core. The thermoplastic material of said outer shell will preferably be a denser, stiffer material than that of the core material, thereby to provide adequate torque resistance to the assembly as well as to assure obtaining the hard, slick exterior properties desired.

In another preferred embodiment, particularly useful for large diameter tubing where the use of expensive radiopaque material is to be minimized in the interest of economy, the relatively thick inner core may be formed of thermoplastic which is X-ray and visually transparent, preferably vinyl, while the thin outer shell may be strongly radiopaque but also preferably visually transparent.

Additional objects and advantages of the invention will be set forth in part hereinafter and in part will be obvious herefrom or may be learned with practice with the invention, the same being realized and attained by means of the steps, methods, compositions, combinations and improvements pointed out in the appended claims.

The accompanying drawings referred to herein and constituting a part hereof illustrate the preferred embodiment of the invention, and together with the description serve to explain the principles thereof.

Figure 1:
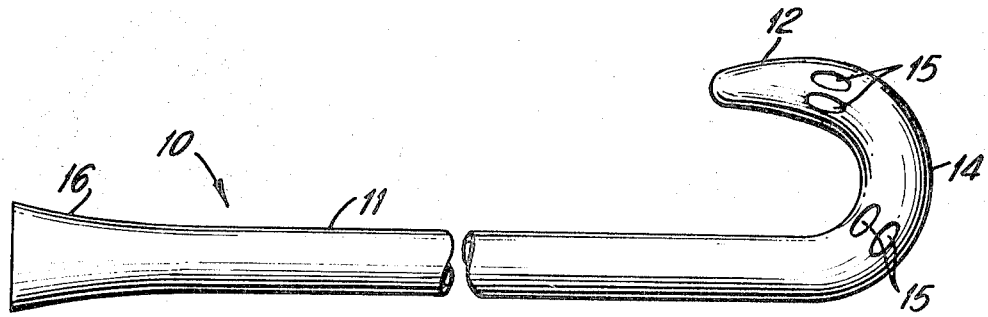
FIG. 1 is a longitudinal view of a catheter made from one form of the tubing made in accordance with the present invention, and wherein, for illustrative purposes, the distal end is tapered and shaped to form a "J" tip, and the proximal end is flared.

Referring in detail to the drawings, FIG. 1 illustrates a finished heart catheter embodying the invention in which tubing 10 tapers down from a main body section 11 of substantially uniform cross section to a curved J-shaped tip 12 as its distal end 14. One or more eyes or openings 15 are also provided in the distal end 14 for the passage of fluids through the tubing 10. The proximal end 16 of the tubing 10 flares or opens outwardly for receiving various equipment such as syringes for injecting fluids into the patient. The tapering and curvature of the tip, the flaring of the eyes and the flaring of the end are all effected by heated tools which utilize the thermoplastic properties of the extruded tubing. Frequently the surgeon forms these parts of the catheter as part of his preparation for an operation.

Figure 3:
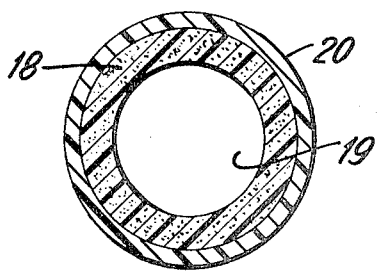
FIG. 3 is an enlarged cross-sectional view of a tubing having a transparent outer shell and a radiopaque core and is a tubing from which the catheter of FIG. 1 may be formed.

Referring now to FIG. 3 which illustrates the cross section of the extruded tubing 10 from which the catheter of FIG. 1 is formed, there is shown an inner tube or core 18 encased within a thin outer shell 20. Both the inner tube 18 and the outer shell 20 are seamless, circular and bonded to each other to form a unitary tubing, preferably be coextrusion. The tube or core 18 is provided with a centrally disposed circular lumen or channel 19.

In accordance with the invention the inner tube or core 18 is formed of a plastic material having the properties of flexibility, suppleness, softness and such angular resistance to twisting and tensile strength as may be compatible therewith so as to provide those physical and thermoplastic properties required by a catheter of the type heretofore generally described. In one preferred embodiment of the invention, polyethylene, preferably nonlinear middle density polyethylene, is used.

It is desired that the inner tube 18 be rendered radiopaque and that as much radiopaque material be incorporated therein as will be compatible with retaining unimpaired the above-described physical properties of the plastic material and without imparting any toxic or other undesirable qualities thereto. Bismuth oxychloride and other bismuth salts (e.g., bismuth subnitrate and bismuthoxide) possess radiopaque properties and have heretofore been used as radiopaque pigments for plastics. In accordance with invention as much as bismuth oxychloride may be incorporated in the polyethylene forming the inner tube 18 as may be required to impart the desired degree of radiopacity, provided that other measures are taken to overcome its undesirable effects.

In accordance with the invention, I may use the radiopaque agent for said inner tube a compound or compounds having the joint properties of imparting both radiopacity and plasticity to the plastic material of the inner tube and being in other respects wholly compatible therewith. When polyethylene is to be used as the plastic material for the inner tube I have found that certain iodinated forms of benzoic acid esters which are solids at room temperature and possess melting ranges compatible with the molding temperatures of polyethylene have the desired plasticizing and radiopacity effects. The chemical forms, properties and methods of making such compounds are more fully described in my copending application Ser. No. 451,962, filed Apr. 29, 1965. However, for the purposes of the present application it may be said that such compounds include both tri- and tetraiodo benzoic acid esters which are solids, desirably having melting points in the general range of about 160° to 400° F., do not decompose at temperatures in that range and because of their high degrees of iodination are capable of imparting high radiopacity to polyethylene. It is also important that such compounds be compatible with polyethylene and that they do not exude under test conditions of high temperatures and high humidities. Among such compounds are Ethyl 2-(3-amino-2,4,6,-triiodobenzoyloxy) butanoate
Methyl 2-(2,3,4,6-tetraiodobenzoyloxy) butanoate
Ethyl 2-(2,3,4,6-tetraiodobenzoyloxy) butanoate The above identified iodinated compounds may be used alone, in intermixture with each other or in intermixture with other radiopaque pigments. When another radiopaque pigment which lacks plasticizing power is used, such as bismuth oxychloride for example, the iodinated esters tend to overcome the detrimental effects of such other pigments by contributing plasticity sufficient to compensate for that which would otherwise be lost because of the presence of the hard, granular bismuth material.

I have also found that, for some purposes and products, bismuth oxychloride can be used as the sole radiopaque agent and its adverse properties compensated for in other ways than by use of iodinated radiopaque plasticizing materials described above. Thus I have found that for the purpose of heart catheterization, when a relatively stiff, torque-resistant tubing is desirable, that the use of a hard outer shell of plastic material can so encase and protect the radioplastic inner core that all necessary properties of stiffness, flexibility and thermoplasticity can be accomplished by using bismuth oxychloride as the sole radiopaque agent in the inner tube an using a polyethylene without any foreign material therein for the outer shell.

For other purposes, where a greater flexibility and softness are desired in the inner core material, as for example for polyethylene tubings of more general medical purposes, especially where some thermoplastic forming or modification in the tubing may be required before use, properties of flexibility, enhanced thermoplasticity and softness may be imparted to the inner or core material by combining a small proportion of another, compatible thermoplastic resin with the polyethylene while continuing to use bismuth oxychloride as the sole radiopaque agent. FOr this purpose I have found that certain new copolymers are particularly useful. I refer to the copolymers of ethylene and vinyl acetate which are presently being made and sold by U.S. Industrial Chemicals Co., a division of National Distillers & Chemical Corporation, under the trade name "Ultrathene" and by E.I. DuPont de Nemours & Co., Inc. under certain grades of the trade name "ALATHON." These copolymers blend effectively and compatibly with polyethylene for coextrusion and provide tubing material having superior properties of flexibility, softness, thermoplasticity and crack resistance which make it ideal for use as the inner or core material in multiwall tubings when a clear polyethylene outer shell or jacket is used.

The ethylene-vinyl acetate copolymer resins which I have found particularly useful for the purposes of the present invention are those having a stiffness range of the order of 10,000 to 25,000 p.s.i., a softening temperature above 140° F. (60° C.); Shore A durometer hardness in the range of 70 to 95 and Shore D in the range of 22 to 46. Particularly useful is the product designated as "Ultrathene" UE 643X, which has a melt index of 3 and density 0.95.

Examples of preferred compositions for the formulation of material to be extruded to form medical-surgical tubings in accordance with tee invention are set forth below. Examples 1 and 2 illustrate compositions wherein iodinated esters are used in combination with bismuth oxychloride to provide the inner tube with desired radiopacity and plasticity.

EXAMPLE 1

A double wall radiopaque polyethylene medical-surgical tubing is extruded at a temperature in the range from about 280° F. to 330° F. in a conventional manner using conventional extrusion equipment having a biorifice tubular die for coextrusion of an inner tube and an outer shell bonded to said inner tube. The tubing has an outer diameter of 0.098 inch and an inner diameter of 0.054 inch, and the inner tube has a thickness of 0.017 inch and the outer shell has a thickness of 0.005 inch. It will be understood that the dimensions given are illustrative but not limiting.

The inner tube employs the following formulation:
900 parts medium density polyethylene, e.g. Tennessee Eastman 874E
600 parts bismuth oxychloride
200 parts Ethyl-2-(3-amino-2,4,6-triiodo-benzoyloxy) butanoate The outer shell employs the following formulation:
medium density polyethylene, e.g. Tennessee Eastman 874E Wherever "parts" is used in the examples it means parts by weight.

The above described multiwall tubing was found to have excellent flaring characteristics, coupled with excellent drawdown value, the proper longitudinal torque and a slick or glasslike outer surface with excellent opacity.

EXAMPLE 2

Following the procedure set forth in example 1, a double-wall radiopaque polyethylene medical-surgical tubing similar to that produced in example 1 is manufactured by the same extrusion techniques by employing the following formulation:

Inner tube
980 parts medium density polyethylene, e.g. Tennessee Eastman 874E
575 parts bismuth oxychloride
100 parts Ethyl-2-(3-amino-2,4,6-triiodobenzoyloxy) butanoate.

Outer Shell
medium density polyethylene, e.g. Tennessee Eastman 874E

Again, this multiwall tubing was found to have excellent flaring characteristics, coupled with excellent draw-down value, the proper longitudinal torque resistance and a slick or glasslike surface with excellent opacity.

EXAMPLE 3

Following the procedure set forth in example 1, a double wall radiopaque polyethylene surgical tubing similar to that produced in example 2 is manufactured by the same extrusion techniques but employs the following formulation:

Inner Tube
900 parts medium density polyethylene, e.g. Tennessee Eastman 874E
590 parts bismuth oxychloride
160 parts Ethyl-2-(3-amino-2,4,6-triiodobenzoyloxy) butanoate Outer Tube
medium density polyethylene, e.g. Tennessee Eastman 874E As in the other example, this tubing has the desired properties necessary for medical-surgical tubing.

I have also discovered that a useful pigment for imparting radiopacity to polyethylene, but which does not possess any plasticizing property, is tetraiodo benzoic acid. The acid may be used as an additive to the tri and/or tetraiodo benzoic acid esters described above when it is desired to increase the radiopacity of the plastic without further plasticization. Tetraiodo benzoic acid can thus be used as a substitute or partial replacement for the bismuth salts and/or at least part of the benzoic acid esters in the foregoing examples.

I have also discovered that adequate radiopacity and the desirable external physical properties of a slick, glasslike surface may be obtained by using a core of medium density polyethylene rendered radiopaque and properly plasticized as described above but with an outer shell of clear polyethylene, preferably of higher density. As shown in FIG. 3, the inner tube or core 24 may be made of the same composition as the tube or core 18 described above. However, the thin outer shell 26 is formed of a high-density polyethylene without any radiopaque material therein and because of the properties of the polymer, possess a relatively hard slick, extruded surface.

Examples of such modified forms of the invention are as follows:

EXAMPLE 4

For lower range sizes of heart catheters, that is corresponding to French catheters sizes 5, 6 and 6, 5, following the procedure set forth in example 1, a double-wall polyethylene surgical tubing in which the inner tube or core is radiopaque and the outer shell transparent to X-rays, is manufactured by the same extrusion techniques but employs the following formulation:

Inner Tube
990 parts medium density polyethylene, e.g. Tennessee Eastman 874E
780 parts bismuth oxychloride
100 parts ethyl 2-(3-amino-2,4,6triiodobenzoyloxy butanoate
3 parts carbon black Outer Shell
High-density polyethylene, e.g. Grace grade PP–60–002

In some cases where greater suppleness is desired at some reduction in exterior hardness and slickness, the outer shell may be made instead of medium density polyethylene of the same grade as that used for the inner tube, as illustrated by examples 1–3.

EXAMPLE 5

For higher range sizes of heart catheters, that is corresponding to French catheters sizes 7, 8 and 9, a somewhat softer and bulkier inner tube composition will meet the torque resistance and Tinius Olsen requirements. Following the procedure set forth in example 1, a double-wall polyethylene surgical tubing in which the inner tube or core is radiopaque and the outer shell transparent to X-rays is manufactured by the same extrusion techniques but employs the following formulation:

Inner Tube
900 parts medium density polyethylene, e.g. Tennessee Eastman 874E
600 parts bismuth oxychloride
100 parts ethyl 2-(3-amino-2,4,6-triiodobenzoyloxy) butanoate
3 parts carbon black Outer Shell
Medium density polyethylene, e.g. Tennessee Eastman 874E.

The multiwall tubings of examples 4 and 5 were found to have excellent flaring characteristics, coupled with excellent draw-down value, the proper longitudinal torque resistance and a relatively hard, slick, glasslike surface. The thin exterior shell is transparent to X-rays and preferably optically transparent as well, thereby somewhat reducing the cost of materials as well as providing an attractive appearance.

In practicing the present invention, suitable medium density polyethylenes are particularly exemplified by those having a density of about 0.928 to 0.940 grams per cubic centimeter at 25° C. Correspondingly, the suitable high-density polyethylenes are particularly exemplified by those having a density of above about 0.940 grams per cubic centimeter at 25° C.

In each of the foregoing examples, ethyl 2-(2,3,4,6-tetraiodobenzoyloxy) butanoate may be substituted for the ethyl-2(3-amino-2,4,6-triiodobenzoyloxy) butanoate in whole or in part.

In some cases, in accordance with the invention, I have found that inclusion of iodinated esters having plasticizing and radiopaque properties may be dispensed with an inorganic radiopaque agents of nontoxic properties, such as the bismuth compounds, particularly bismuth oxychloride, may be used as the sole radiopaque material. In such cases it appears that the protective effects of the external shell or casing of clear polyethylene sufficiently encases and overcomes the tendency to of bismuth compounds to impart roughness, poor ductility and undue stiffness to the composite tubing so that such tubings are useful in many applications, especially where a relatively high degree of internal softness and suppleness are not required. The following example 6 illustrates a tubing embodying these features of the invention:

EXAMPLE 6

Following the extrusion procedures of example 1 a tubing employing the following formulation may be extruded:

Inner Tube
1100 parts low medium density polyethylene, e.g. DuPont Alathon 14
925 parts fine pigment bismuth oxychloride
3 parts coloring pigment, e.g. Konnstamm Black Outer Tube
higher medium density polyethylene, e.g. Tennessee Eastman 874E.

The foregoing type of product is preferably extruded in a range of sizes. The formulation of example 6 is adapted to produce a larger size in said range, e.g. an O.D. of 0.110 inch; and I.D. of 0.071 inch; the inner core having a radial wall thickness of 0.0175 inch and the outer shell a radial wall thickness of 0.002 inch. The smallest tubing of said size range may have an O.D. of about 0.065 inch; and I.D. of about 0.026 inch; the inner core having a wall thickness of 0.0195 inch and the outer shell a wall thickness of about 0.002 inch.

EXAMPLE 7

Inner Tube 1089 parts low medium density polyethylene, e.g. DuPont Alathon 14
960 parts fine pigment grade bismuth oxychloride
50 parts copolymer of ethylene-vinyl acetate with melt index of 3 and density of 0.95, e.g. "Ultrathene" UE634X
3 parts coloring pigment, e.g. Konnstamm Black Outer Tube higher medium density polyethylene, e.g. Tennessee Eastman 874E. 874

Products similar in composition to that if example 7 may be made in a range of sizes similar to those described under example 6.

Figure 2:
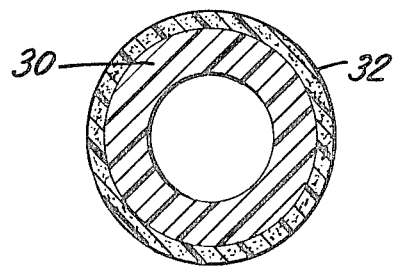
FIG. 2 is an enlarged cross-sectional view of tubing having a radiopaque, visually transparent outer shell and a transparent core.

In another form of the invention a relatively inexpensive, transparent vinyl tubing can be provided in cases where the overall diameter of the tubing is large (FIG. 2). Examples of such tubing are those for rectal, thoracic and stomach use where tubes having diameters of the order of three eights inch or greater may be used. In such construction the inner tube 30 may be the major part of the body of the total tube or catheter and it may be formed of clear vinyl plasticized with conventional materials so that it will remain transparent to X-rays and visual observation. A relatively thin outer shell 32 will be formed about the inner tube 30, also of vinyl, but containing a substantial amount of radiopaque material, such as 1400 parts of n-butyl-2,3,4,6-tetraiodobenzoate or 2-ethoxyethyl-2,3,4,6-tetraiodobenzoate or in the case of such large tubing the mass and size of the outer shell will be sufficient to provide adequate contrast under X-ray photography or fluoroscopy, thereby revealing the position of said outer shell as strong shadows at the external borders thereof. At the same time, with the outer shell 32 and the inner tube or core 30 both being visually transparent, they will reveal radiopaque contrast media passing through the lumen thereof and will also reveal clots or other obstructions appearing therein. An example of such tubing formulation is as follows:

EXAMPLE 8

A double-wall radiopaque vinyl medical-surgical tubing particularly useful for rectal, thoracic and stomach use having an outer diameter of 0.375 inch and an inner diameter of 0.250 inch was extruded in a conventional manner employing a biorifice tubular die for coextrusion and two concentric bonded tubings where the inner tube has a radial wall thickness of 0.045 inch and the outer shell has a wall thickness of 0.020 inch.

The inner tube, which is visually and X-ray transparent employs the following formulation:

50 parts polyvinyl chloride, e.g. Dow Chemical Company, 100-4 polyvinyl chloride
33 parts dioctyl phthalate
15 parts epoxol, e.g. Swift & Company, epoxol 9.5
2 parts calcium-zinc stabilizer compound, e.g. Advance Solvents and Chemical Corporation CZ 11C The outer shell, which is X-ray opaque but visually transparent, employs the following formulation:

1000 parts polyvinyl chloride, e.g. Dow Chemical Company, 100-4 polyvinyl chloride
1400 parts 2-ethoxyethyl-2,3,4,6-tetraiodobenzoate
80 parts epoxol, e.g. Swift & Company, epoxol 9.5
20 parts calcium-zinc compound, e.g. Advance Solvents and Chemical Corporation CZ 11C

EXAMPLE 9

A tubing otherwise similar in all respects to that of example 8 was modified to the radiopaque plasticizing material for the outer shell to include:

700 parts 2-ethoxyethyl-2,3,4,6-tetraiodobenzoate and
700 parts 2-ethoxyethyl-2,5-diiodobenzoate This combination provided an outer shell which was softer and more flexible that that of the example 8.

When even greater softness and flexibility is required in the outer shell, the entire radiopaque plasticizing agent therefor may be an adequate quantity of only 2-ethoxyethyl-2,5-diiodobenzoate which has a relatively high plasticizing value. That compound and methods of making same are disclosed in U.S. Pat. No. 3,361,700, issued Jan. 2, 1968.

The invention in its broader aspects is not limited to the specific steps, methods, compositions herein shown and described but departures may be made therefrom within the scope of the accompanying claims, without departing from the principles of the invention and without sacrificing it chief advantages.

What is claimed is:

1. A medical-surgical catheter tubing comprising a relatively thick interior tubular portion of thermoplastic material which is visually transparent and transparent to X-rays radiation and a thin concentric outer shell of thermoplastic material which is visually transparent and rendered strongly radiopaque by an organic iodine compound or a mixture of such compounds distributed uniformly throughout said shell, said shell being coextruded with and bonded to said inner portion, said shell having an external surface rendered smooth and hard by extrusion.

2. The tubing of claim 1 wherein said inner and outer portions are polyvinyl thermoplastics.

3. The tubing of claim 1 wherein the tubing has a diameter of at least three-eighths inch, and the outer shell has a wall thickness of 0.020 inch.

4. The tubing of claim 3 wherein the inner tubular portion has relatively high flexibility and softness, said shell having greater hardness and torque resistance than said inner portion.

5. A medical-surgical catheter tubing including an elongated, extruded tube of polyethylene containing a nontoxic, radiopaque substance intermixed therewith, and a relatively thin shell of extruded polyethylene encasing said tube and having a hardness and exterior smoothness superior to those of said tube, said tubing being highly flexible for conforming to tortuous body passages through which the tubing is passed yet having substantial angular resistance to twisting about its longitudinal axis so that the distal end will rotate in substantial conformity to twisting of the proximal end when the tubing is being passed through an is positioned in such body passages.

6. The tubing of claim 5 wherein the tube is of medium density polyethylene and the encasing shell is of higher density polyethylene.

7. The tubing of claim 5 wherein the radiopaque substance of said tube is bismuth oxychloride.

8. The tubing of claim 5 wherein the radiopaque substance in the thermoplastic material of said tube is a mixture of the organic iodine compound and bismuth oxychloride.

9. The tubing of claim 5 wherein said exterior shell is formed of polyethylene free of radiopaque material.

10. The tubing of claim 7 wherein the thermoplastic material of said tube is a mixture of polyethylene and an ethylene-vinyl acetate copolymer.

* * * * *

PO-1050
(5/69)

UNITED STATES PATENT OFFICE
CERTIFICATE OF CORRECTION

Patent No. 3,618,614      Dated   November 9, 1971

Inventor(s)  Vincent J. Flynn

It is certified that error appears in the above-identified patent and that said Letters Patent are hereby corrected as shown below:

In Column 8, line 29, "X-rays" should read -- X-ray --; and in line 56, "an" should read -- and --.

Signed and sealed this 23rd day of May 1972.

(SEAL)
Attest:

EDWARD M. FLETCHER, JR.
Attesting Officer

ROBERT GOTTSCHALK
Commissioner of Patents